United States Patent [19]
Washburn et al.

[11] Patent Number: 5,184,288
[45] Date of Patent: Feb. 2, 1993

[54] HIGH FREQUENCY POLY-PHASE RECTIFIER FOR CONVERTING AC POWER SIGNAL TO DC

[75] Inventors: Robert D. Washburn, Malibu; Robert S. Wedeen, Manhattan Beach; Robert F. McClanahan, Valencia; William J. Council, Newbury Park; David M. Lusher, Gardena, all of Calif.

[73] Assignee: Hughes Aircraft Company, Los Angeles, Calif.

[21] Appl. No.: 722,573

[22] Filed: Jun. 27, 1991

[51] Int. Cl.[5] .............................................. H02M 7/08
[52] U.S. Cl. .......................................... 363/4; 363/45; 363/70
[58] Field of Search ........................ 363/2–4, 363/45, 69, 70, 126, 156, 13; 307/151

[56] References Cited

U.S. PATENT DOCUMENTS 1,867,503  7/1932  Fitz et al. .
3,088,066  4/1963  Seeley .
3,258,673  6/1966  Logan .
4,084,217  4/1978  Brandii et al. ........................ 363/4
4,980,810 12/1990  McClanahan et al. ............. 363/131

FOREIGN PATENT DOCUMENTS 1072508  6/1967  United Kingdom ................... 363/4

Primary Examiner—William H. Beha, Jr.
Attorney, Agent, or Firm—L. A. Alkov; W. K. Denson-Low

[57] ABSTRACT

A power rectifying circuit (10) for converting an AC power signal to DC which includes a plurality of rectifiers (20) that receive power from a single AC power source (12). The AC power signal is power split amongst the plurality of rectifiers (20). Each power split signal is phase shifted by an incremental amount of phase shift and provided to on of the rectifiers (20). The rectified DC output of each rectifier is summed together and provided to a load (22) as DC power.

12 Claims, 2 Drawing Sheets

HIGH FREQUENCY POLY-PHASE RECTIFIER FOR CONVERTING AC POWER SIGNAL TO DC

BACKGROUND OF THE INVENTION

1. Field of the Invention

This invention relates to power rectifiers for converting AC power signals to DC and, more particularly, to poly-phase rectification circuits employing a plurality of rectifiers.

2. Discussion

Power rectifiers are used in a wide variety of power applications. Generally such devices apply a single AC power signal to a single rectifier for rectifying the signal, thereby converting the alternating current (AC) signal to direct current (DC). When a high DC power output is required, poly-phase rectifier circuits have been used. Poly-phase rectification circuits typically use standard multi-phase rectifiers, each rectifier being driven by a separate AC source. These devices are constructed such that the rectified DC output signals obtained from the plurality of rectifiers are summed and provided to a load. This kind of rectification circuit permits each rectifier to conduct for a desired phase of the AC cycle, resulting in a smaller ripple effect on the DC output signal.

These rectifier configurations, however, present a very large variation in reactance as they switch between conducting and non-conducting states. This variation can adversely affect the efficiency and general performance of resonant Radio Frequency (RF) power sources. At very high frequencies it is more difficult to make rectifiers handle a lot of current because inevitably they switch loads much faster. Furthermore, with large amounts of current it is difficult to get a rectifier to switch fast enough to enable it to operate at very high frequencies. Thus, in general, the more current flowing through a rectifier, the less efficient it is. Therefore, it is desirable to have a more efficient rectification circuit that is capable of handling very high frequency signals as well as very large power signals.

SUMMARY OF THE INVENTION

According to the teachings of the present invention, a more efficient high frequency poly-phase rectifier is provided by employing a plurality of rectifiers, each receiving phase shifted, power split AC signals from a single power source. The power rectifying circuit receives an AC power signal. This signal is power split amongst a network including a plurality of rectifiers, each rectifier being coupled in parallel to the other rectifiers. In the preferred embodiment, the power split AC signals entering the various rectifiers are incrementally phase shifted such that the reflected powers sum to zero at the source. This causes a significant reduction in circulating currents and causes the rectifier reactance, as seen by the source, to remain essentially constant. The constant reactance results in improved RF power source stability which allows for wider dynamic load ranges. Hence, RF power source stability is enhanced. The rectified DC output signals of each rectifier are then summed together and provided to a load as a DC power signal.

This use of multiple rectifiers with staggered phase shifts reduces the amount of current flowing through each rectifier which reduces the forward voltage drop of each rectifier. As a result, the power loss of each rectifier is less than that of a conventional rectifier with high peak current. Thus, a more efficient means for rectification is obtained and described herein.

In addition, impedance matching networks can be used as required to minimize reflected power and thereby provide optimum efficiency.

Furthermore, the invention may be advantageously implemented with small inexpensive components such as printed microstrip, stripline, or other cavity structures which provide lower production cost and high field reliability.

BRIEF DESCRIPTION OF THE DRAWINGS

The various advantages of the present invention will become apparent to those skilled in the art by reading the following specification and by reference to the drawings in which.

DESCRIPTION OF A PREFERRED EMBODIMENT

Figure 1:
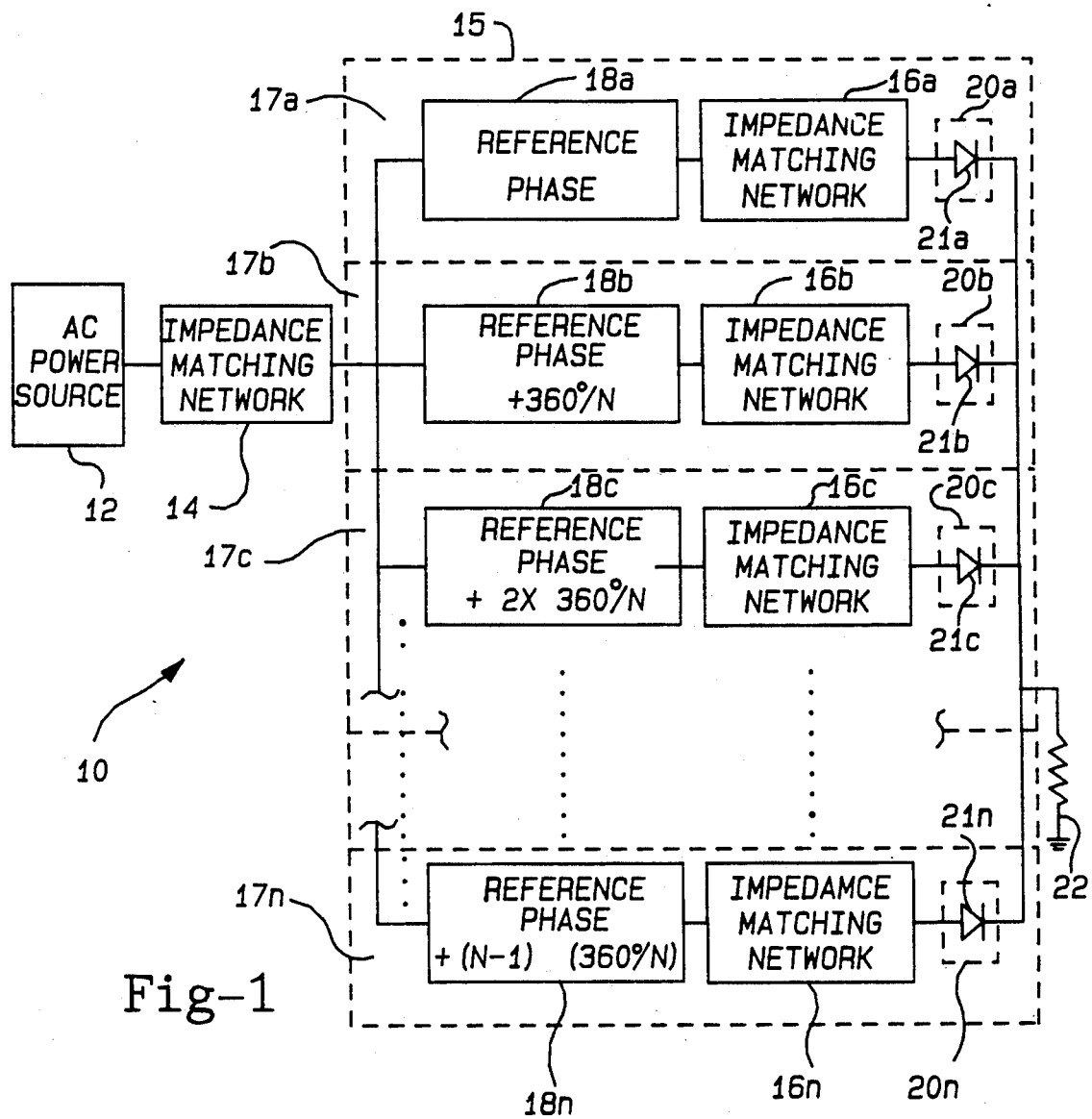
FIG. 1 is a block diagram which illustrates the basic concept of the half-wave rectification circuit made in accordance with the teachings of the preferred embodiment of this invention.

In the following description and in the Figures shown herein, elements of the same kind are identified with the same reference numerals.

Turning now to FIG. 1, a poly-phase rectification circuit 10 is illustrated therein. An AC power source 12 generates an alternating current (AC) power signal, which for purposes of this application may be a Radio Frequency (RF) signal with a very high frequency of about 100 megahertz or greater. Coupled to the output of the AC power source is an impedance matching network 14. Connected to the output of impedance matching network 14 is a network 15 which comprises a series of branches 17(a–n), each branch being located in parallel to the other branches. Each branch 17 of the network 15 includes a phase shifter 18, an impedance matching network 16 and a rectifier 20, coupled in series. As a result, the power applied to the network 15 is split amongst the various branches 17 of the network 15.

The phase shifters 18 function to provide for selected incremental shifts in the phase of the power split signals. Coupled to each phase shift is a second impedance matching network 16. Both impedance matching networks 14 and 16 function to linearize and adjust the impedance of the rectifier and minimize reflected power. The impedance matching networks used herein are standard circuit networks, and as such, are not described here in detail.

Coupled to each impedance matching network 16 is a rectifier 20. Various types of rectifiers may be used to provide either half-wave rectification or full-wave rectification. Each rectifier 20 shown in FIG. 1 is composed of a single diode for providing half-wave rectification. These diodes are, for example, manufactured by International Rectifier and have a model number 11DQ06. Other suitable diodes or rectification means may be used for providing half-wave or full-wave rectification.

Rectifiers 20 rectify the AC power split, phase shifted signals, thereby converting each AC signal to DC. The rectified DC outputs of each rectifier 20 are then coupled together and connected to a load 22. The resulting signal is a summation of the rectified DC signals. If necessary, a filter (not shown) may be connected in series with the load 22 to provide a more stable DC output signal.

Figure 2:
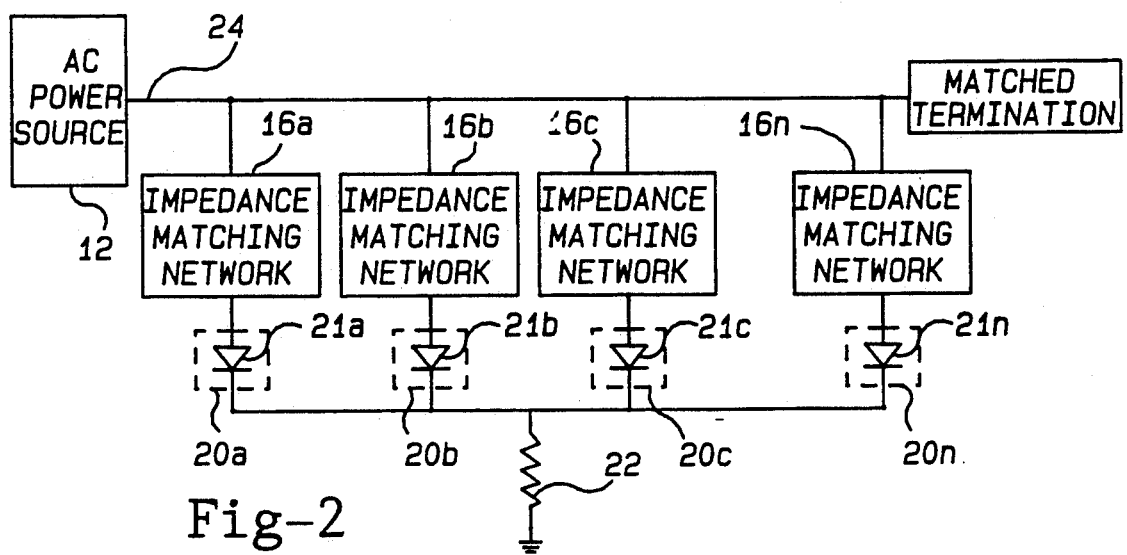
FIG. 2 is a block diagram of the half-wave rectification circuit illustrating a tapped transmission line approach.

Turning now to FIG. 2, there is shown a half-wave rectification circuit which utilizes a tapped transmission line approach. An AC power signal is transmitted on a transmission line 24. Power from the traveling wave is tapped from the transmission line 24 to provide AC power signals with desired phase shifts to rectifiers 20. Given the frequency of the AC power signal, power is tapped at various locations displaced along the electrical length of the transmission line, so as to provide incremental phase shifts to the AC signal applied to each rectifier 20.

Figure 3:
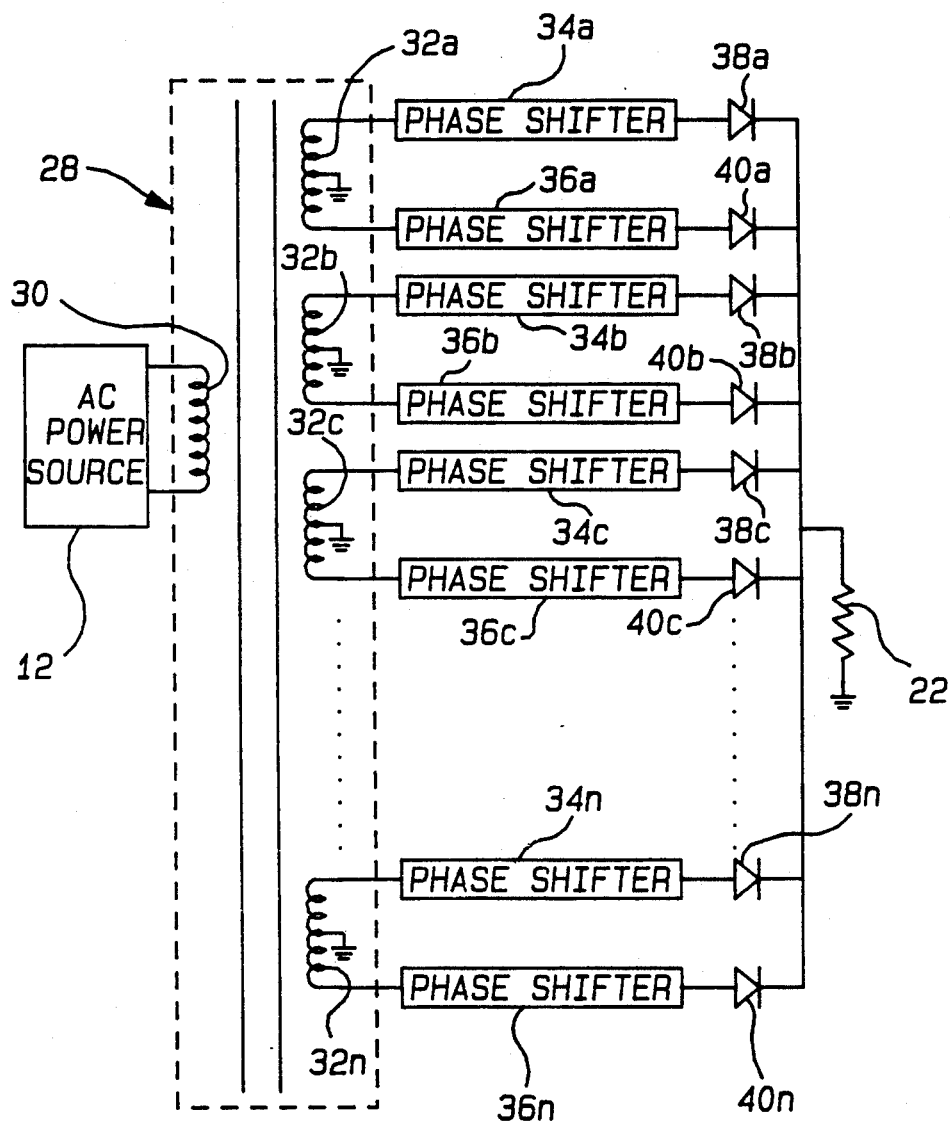
FIG. 3 is a block diagram which illustrates a full-wave rectification version of the present invention, implemented with transformers.

In FIG. 3, there is shown a full-wave rectifier. The overall concept is the same, but use has been made of full-wave rectification. An AC power signal is tapped from a transformer 28 having primary 30 and secondary 32 windings. The power split signal from secondary windings 32 are phase shifted by shifters 34 and 36, and applied to two diodes 38, 40 that are constructed in a manner that provides for full-wave rectification. Other suitable full-wave rectification circuits may be used.

In operation, the poly-phase rectification circuit 10 receives an AC power signal from the AC power source 12. The rectifier disclosed herein is most advantageous when supplied with an AC power signal with a very high frequency of at least 1 megahertz, preferably about 100 megahertz or greater. The single AC power source 12 supplies a signal to a plurality of rectifier branches 17.

The number of rectifier branches utilized by this circuit depends on various factors such as power losses throughout the circuit. A greater number of branches provides for less current through the diodes in each branch which results in greater efficiency. Likewise, the RF power source stability is enhanced with a greater number of phases. However, too many branches will result in an unnecessarily high number of components and excessive circuit size and cost. An optimum circuit may consist of six to eight rectifier branches. However, more or less rectifier branches may be used depending on the characteristics of the particular application and circuit components used.

The AC power signal is first applied to an impedance matching network 14 which provides for a more linear impedance of the circuit. Next, the AC power signal is power split about equally between the branches 17($a$–$n$). Each AC power split signal is then phase shifted by phase shifters 18. It is preferred that the phase shifts chosen are incremental with respect to the adjacent rectifier branches. In addition, it is also preferred that the summation of the phase shifts adds up to 360°. Therefore, the amount of phase shift applied to each power split signal is dependent on the number of rectifier branches used in the particular application (e.g., if the circuit includes six rectifier branches then the appropriate incremental phase shifts would be 0°, 60°, 120°, 180°, 240°, 300°).

The phase shifting can be accomplished in a number of ways. It can be carried out with the use of passive networks which include inductors and capacitors electrically connected in any one of a number of combinations. Phase shifting could be accomplished by tapping into a transmission line 24 as shown in FIG. 2. Essentially, this consists of tapping into a piece of coaxial cable at the appropriate electrical length to obtain a desired phase shift. Another way to obtain phase shifting is with the use of a microstrip or strip-line quasi-transverse electromagnetic load. These are essentially planar structures that work in a similar way as the coaxial cable. However, the line width, length, and thickness are varied in order to obtain the desired phase shift and characteristic impedances.

Rectifier branches are typically composed of non-linear components such as diodes, which have highly non-linear impedances. As a result, these non-linear components cause the voltage and current to be out of phase. To eliminate this effect, impedance matching networks 16 are coupled to the input of each rectifier 20 to provide for a more linear rectifier impedance. These impedance matching networks 16, as well as impedance matching network 14, are used herein to minimize reflected power and thereby provide optimum efficiency. In effect, an average impedance is provided. The impedance matching networks 16 and 14 further allow for adjustment of the impedance so that the amount of current passing from the source 12 into each rectifier branch 17 can be further decreased by increasing the impedance (e.g., if a given rectifier has an impedance of 2 ohms at a given voltage, the impedance matching network can adjust the impedance to about 50 ohms). As shown in FIG. 1, it is preferred that the rectification circuit 10 have both an impedance matching networks 16 coupled to each rectifier 20, in addition to an impedance matching network 14 coupled to the power source 12. However, the use of one or the other may be sufficient for purposes of this application. These impedance matching networks 14 and 16 are standard circuits which include an array of capacitors and inductors, and as such are not described here in detail.

The rectified DC signal outputs of rectifiers 20 are summed together to form a single DC output which is to be supplied to a given load 22. Because each rectifier 20 conducts current only throughout a given phase, the summation of the rectifier outputs results in a ripple effect on the resultant DC signal. If desired, a filter (not shown) may be coupled to the load to eliminate any ripple to thereby provide further smoothing of the DC output signal.

In view of the foregoing, it can be appreciated that the present invention enables the user to achieve high efficiency of a high frequency poly-phase rectifier. Thus, while this invention has been described in connection with a particular example thereof, no limitation is intended thereby except as defined by the following claims. This is because the skilled practitioner will realize that other modifications can be made without departing from the spirit of this invention after studying the specification and drawings.

What is claimed is:

1. A power rectifying circuit for converting alternating current (AC) to direct current (DC), comprising:
   input means for receiving an AC power signal;
   output means for supplying a load;
   a network including a plurality of rectifiers coupling the input to the output, the rectifiers being arranged parallel to each other such that the AC power signal is split among the rectifiers; and
   means for phase shifting the AC power signal comprising means coupled to a transmission line and displaced along its electrical length in such a manner as to provide incremental phase shifts to each rectifier, so that the AC power signal is applied to each of the rectifiers with a different phase.

2. The circuit of claim 1 wherein the AC power signal is derived from a single high frequency power source.

3. The circuit of claim 2 wherein said means for phase shifting provides incremental phase shifts to the AC signal applied to the rectifiers.

4. The circuit of claim 3 wherein the sum of the incremental phase shifts is 360°.

5. The circuit of claim 1 wherein the phase shifts are chosen such that reflected power signals sum to zero at the input means.

6. The circuit of claim 1 wherein each rectifier includes at least one rectifying diode for providing half-wave rectification.

7. The circuit of claim 1 wherein each rectifier includes at least one rectifying diode for providing full-wave rectification.

8. The circuit of claim 1 which further comprises impedance matching means for minimizing reflected power by providing a more linear and adjustable impedance of the rectification means.

9. A power rectifying circuit comprising:
a single source of AC power signal;
a network having a plurality of parallel branches;
rectification means in each branch for rectifying a signal applied to an input thereof;
means for coupling the AC power signal to inputs of each branch;
phase shifter means in each branch for shifting the phase of the AC signal by a preselected phase shift, comprising means coupled to a transmission line and displaced along its electrical length in such a manner as to provide incremental phase shift to each rectifier, wherein each phase shifter means operating to shift the phase in each branch by a different amount to thereby decrease the current flow through each rectification means in each branch and increase the efficiency of the rectifying circuit.

10. The circuit of claim 9 wherein the preselected phase shifts are incremental and sum 360°.

11. A method for converting alternating circuit (AC) to direct current (DC), which comprises:
receiving a single high frequency AC power signal;
splitting the AC power signal among a plurality of rectifiers;
incrementally shifting the phase of the AC power signal among the rectifiers by coupling said AC to a transmission line and displacing along an electrical length of said transmission line;
rectifying the phase shifted signals in each rectifier;
summing the rectified phase shifted signals together to generate a DC output signal; and
applying the DC output signal to a load.

12. The method of claim 11 further comprising minimizing reflected power by applying impedance matching means which linearize and allow for adjustment of the rectification means.

* * * * *